United States Patent [19]

Bergmann

[11] Patent Number: 5,526,439
[45] Date of Patent: Jun. 11, 1996

[54] OPTICAL FILTER USING ELECTRO-OPTIC MATERIAL

[75] Inventor: Ernest E. Bergmann, Fountain Hill, Pa.

[73] Assignee: AT&T Corp., Murray Hill, N.J.

[21] Appl. No.: 367,379

[22] Filed: Dec. 30, 1994

[51] Int. Cl.⁶ ................................................ G02B 6/28
[52] U.S. Cl. ...................................... 385/24; 385/40
[58] Field of Search ................... 385/27, 24, 39, 385/40

[56] References Cited

U.S. PATENT DOCUMENTS

| | | | |
|---|---|---|---|
| 3,936,144 | 2/1976 | Caton | 385/27 |
| 4,252,402 | 2/1981 | Puech et al. | 385/40 |
| 4,679,893 | 4/1986 | Ramer | 385/16 |
| 4,768,850 | 6/1988 | Moslehi et al. | 385/27 |
| 4,818,050 | 4/1989 | Duthie | 385/40 X |
| 5,022,730 | 12/1989 | Cimini et al. | 385/24 |
| 5,044,715 | 2/1990 | Kawachi et al. | 385/42 |
| 5,148,507 | 9/1992 | Tanisawa | 385/40 X |
| 5,321,782 | 6/1994 | Mugino et al. | 385/40 |

*Primary Examiner*—Akm E. Ullah
*Attorney, Agent, or Firm*—Richard D. Laumann

[57] ABSTRACT

An optical filter in fabricated in an electro-optic material such as lithium niobate and uses a plurality of pairs of waveguides coupled to each other by optical coupling regions. The waveguides and optical coupling regions overlying electrodes which are used to tune the filter by varying the optical path length difference between waveguides and the optical cross coupling in the optical coupling regions.

4 Claims, 2 Drawing Sheets

OPTICAL FILTER USING ELECTRO-OPTIC MATERIAL

TECHNICAL FIELD

This invention relates generally to the field of optical devices and particularly to the field of optical filters that use electro-optic material.

BACKGROUND OF THE INVENTION

Optical communications systems using optical fibers have developed rapidly and are extensively used at the present time. Together with the development of optical communications systems, the field of integrated optics has developed. Integrated optics creates opto-electronic components, such as light sources, photodetectors, switches, modulators, amplifiers, and filters, on a common substrate in a manner analogous to silicon integrated circuits. Of course, not all such devices need be present in one circuit.

As might be expected, many opto-electronic components have been developed for both integrated optics as well as for other purposes. For example, optical filters are useful as multiplexers in wavelength division multiplexing systems. Lasers are used as light sources for communications purposes. Modulators have been developed using waveguides fabricated in lithium niobate substrates. Several opto-electronic components will be briefly described.

Ramer teaches a structure that he states to be useful as a switch, modulator, or filter in U.S. Pat. No. 4,679,893 which issued Jul. 14, 1987. The structure had two waveguides that were optically coupled to each other at two positions by optical couplers. Electrodes on the waveguides and the couplers controlled the operation of the structure. Again, the structure could be used as an interferometer, modulator, broadband switch, or a narrow band filter.

Moslehi et al(Moslehi) describe a fiber optic lattice filter in U.S. Pat. No. 4,768,850 which issued Sep. 6, 1988. "Filter," as used in this patent, means filtering of modulation impressed upon a signal as Moslehi is interested in signal processing operations. "Filter" does not mean a structure that is used to filter radiation with respect to radiation. The filters disclosed are limited to fiber optic filters, and there is no discussion of electro-optic tuning of the filter described or of other types of filters.

Kawachi et al(Kawachi) describe a component useful in optical switches in U.S. Pat. No. 5,044,715 which issued Sep. 3, 1991. Special attention is drawn to FIG. 17 which depicts two waveguides that are optically coupled to each other at a plurality of points. The structure depicted is designed and used for broadband purposes; that is, the switching function performed should be wavelength independent. In other words, the desired switching function requires achromatic performance. Other figures of interest include 28 and 33; again, broadband performance is obtained.

Cimini et al (Cimini) describe a wavelength tunable optical filter useful in wavelength division multiplexing systems in U.S. Pat. No. 5,022,730 which issued on Jun. 11, 1991. The filter specifically described uses a distributed Bragg reflector and a high reflectivity mirror. The approach taken by Cimini with a distributed Bragg reflector and a mirror thus differs considerably from the approaches taken in the previously described structures which use waveguides.

The prior art also shows waveguide filters that can be tuned using the thermo-optic effect to differentially change paths of adjacent and optically coupled waveguides thereby producing the desired filtering effect. This technique of thermo-optic heating has the drawback of being both relatively slow and requiring relatively high continuous power dissipation to produce and maintain the required temperature changes. It is noted that there are many applications in which the slow response time is not a significant disadvantage. The prior art also shows, as previously mentioned, waveguides fabricated in electro-optic materials such as lithium niobate. However, multi-stage filters have not been fabricated in such materials. There are several possible explanations as to why such filters have not been fabricated. First, it may have been believed that the required path length difference could not be expeditiously obtained given the constraint of a finite size lithium niobate substrate. Second, it may have been believed that processing variations in fabricating the waveguides were too large for the structures to be useful in these applications.

SUMMARY OF THE INVENTION

According to an exemplary embodiment of this invention, an optical filter has a substrate comprising an electro-optic material, and a plurality of waveguide stages in the substrate. The first and last of the waveguide ends are adapted to use as first and second inputs and outputs, respectively. A pair of continuous waveguides forms the waveguide stages and the waveguide ends. Continuous is used to mean continuity of optical path; portions of the waveguides may be offset with respect to other portions to, for example, minimize losses in bends. The filter also has a plurality of optical coupling regions that optically couple the pair of waveguides to each other at a plurality of points. A plurality of electrode pairs individually controls the several optical coupling regions and a plurality of electrodes individually effects the several waveguide stages. The electrode pairs control the filter characteristics of the optical filter. In particular, the electrode pairs controlling the several optical coupling regions control the optical cross coupling between the waveguides. The electrode pairs effecting the several waveguide stages control the several optical path length differences in the waveguides between adjacent optical coupling regions. The electrode pairs are used to tune the filter response; the strength of the coupling may differ between optical coupling regions, and the path length difference may differ between waveguide stages. The filter response becomes sharper, that is, more precise, as more waveguide stages are added; it may approach the ideal response more closely.

In a preferred embodiment, the electro-optic material comprises lithium niobate. In yet another preferred embodiment, the waveguides within a waveguide stage have different path lengths. In still another preferred embodiment, a second optical filter is attached to one of the outputs of the first optical filter to obtain a still better filter response.

For reasons of clarity, the elements depicted are not drawn to scale.

DETAILED DESCRIPTION

Figure 1:
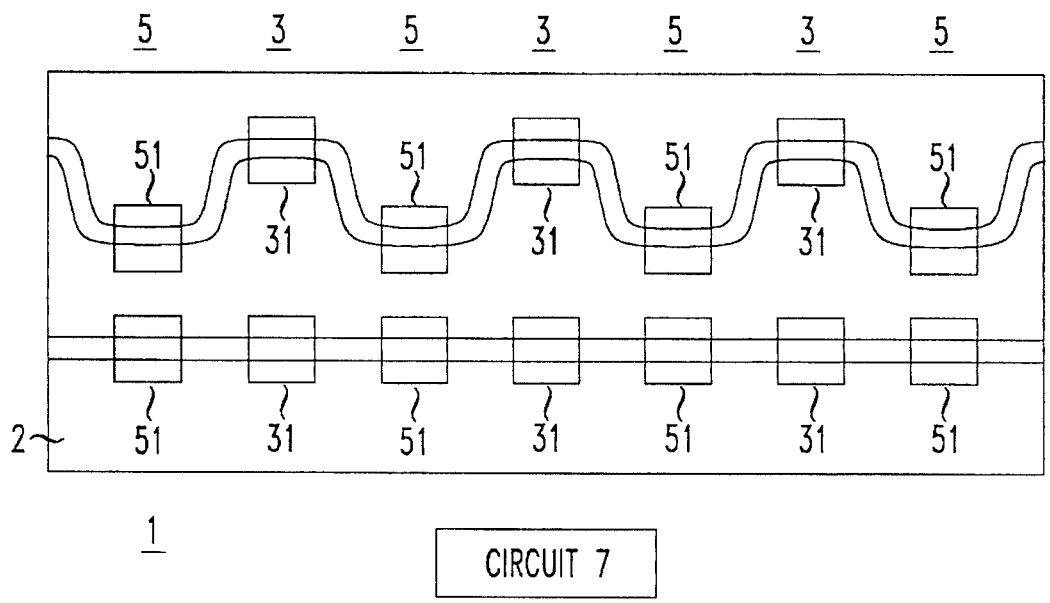
FIG. 1 is a top view of a multi-stage filter according to this invention.

The invention will be described by reference to the exemplary embodiment depicted in FIG. 1. The embodiment depicted is a wavelength division multiplexer 1 (WDM) having a filter comprising a substrate 2, a plurality of waveguide stages 3, and a plurality of optical coupling regions 5. Adjacent waveguide stages 3 are coupled to each other by an optical coupling region 5. The plurality of waveguide stages is formed from two continuous waveguides. It is again noted that continuous is used in the sense of continuity of optical path; the presence of discontinuities in the indiffused waveguide at, for example, bends, is not precluded. The ends of the two waveguides in the first and last waveguide stages are used as inputs and outputs, respectively. That is, the ends of the two waveguides are adapted for use as inputs and outputs, respectively. Three waveguide stages, in addition to the first and last waveguide stages, are shown. More waveguide stages may be present to permit the filter response to be controlled more precisely. Of course, two stages may also be used. The number of waveguide stages present is the result of a compromise between; for example, the desire for precise control of the filter response and the amount of substrate area available. The waveguides within a waveguide stage have different path lengths in order to be wavelength sensitive. There are also a plurality of electrode pairs 31 and 51 on the waveguides in the waveguide stages 3 and the optical coupling regions 5, respectively. Electrical circuit 7 has connections (not shown) to the plurality of electrode pairs 31 and 51, and applies the proper voltages to the electrode pairs to produce the desired filter response as explained below. Each electrode pair may be separately connected and the each electrode within a pair may be connected separately. For reasons of clarity, the connections between circuit 7 and electrodes 31 and 51 have not been shown.

The substrate comprises an electro-optic material. Lithium niobate is an exemplary material because of its electro-optic characteristics and the ease of waveguide fabrication. The waveguides are expediently fabricated by depositing a material of, for example, titanium, and then using standard lithographic patterning techniques to leave metal over only those regions where the waveguides are desired. The substrate with the patterned metal is then heated for a sufficient time to indiffuse the metal and raise the refractive index and thereby form the desired waveguides. Temperatures and times, as well as metal layer thickness, will be readily selected by those skilled in the art. The electrodes are then formed using conventional techniques such as sputter deposition followed by patterning.

Other electrode configurations may be used. For example, reverse β coupling may be used as may be single split electrodes. The path length difference may be varied with a single electrode in a waveguide stage. It will also be appreciated that the TE and TM may be controlled separately with appropriate electrode configurations.

The filter is especially useful as a four port filter. This term is used to mean an optical device with two single mode input and two single mode output ports. Of course, not all four ports need be connected for all applications. For purposes of understanding and design, it is also assumed that only amplitude pairs need be considered at any cross section of the filter. It is also assumed that all responses are linear; that is, the output amplitudes are linear functions of the input amplitudes. The filter aspect depends upon the fact that the amplitude response depends upon the choice of optical frequency; in other words, optical wavelength.

The two modes that are considered in the filter may be two spatial modes or two orthogonally polarized modes. For applications where the input and output are supposed to be polarization independent, it may be necessary to split the input into polarization components and couple them to identical two mode filters and then combine their outputs in a polarization combiner. Alternatively, the filtering characteristics for orthogonal polarizations can be so similar and juxtaposed that the filter is essentially polarization independent.

Operation may be understood from consideration of the following. The electrodes along the waveguide stages control the optical path length difference between adjacent optical coupling regions. The electrodes associated with the optical coupling regions control the optical cross coupling in the optical coupling regions. By varying the waveguide and electrode geometry, the path length difference for orthogonal polarizations can be controlled separately. A single stage by itself produces a generally sinusoidal transmission behavior with wavelength. However, the invention uses a plurality of such stages thereby permitting the filter response to be controlled more precisely. As more waveguide stages are added, the filter response begins to look like the response of a multi-pole/multi-zero electrical filter although it repeats periodically in wavelength. The precise path length difference, in any waveguide stage, is not critical give or take an integral number of wavelengths. As the path length differences of all the stages are changed, the filter response shifts in wavelength.

Those skilled in the art will readily select appropriate path length differences and the strength of the optical couplers; that is, the amount of signal cross coupling. Precise numbers will depend upon the wavelength and the application. It has been found that a reduction in side lobe response is obtained with coupling that is strongest the the central optical couplers and which decreases towards the first and second optical couplers. Of course, a different desired filter response may have different coupling relationships; those skilled in the art will readily determine the strengths of the optical couplers.

Figure 2:
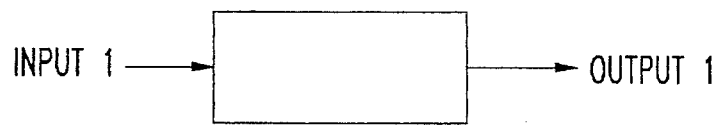
FIGS. 2–5 are schematic depictions of applications of filters according to this invention.
Figure 3:
Figure 4:
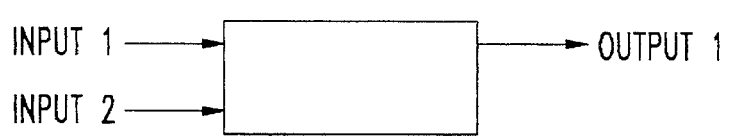
Figure 5:
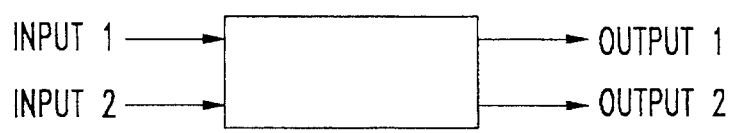

Several applications that use the filter of this invention are schematically illustrated in FIGS. 2–5 and will now be described. Operation will be understood after proper consideration of the preceding paragraphs. For reasons of clarity, only the first and last waveguide section pairs; that is, the pairs that act as inputs and outputs, are explicitly depicted. The intermediate waveguide pairs and the optical couplers are present in and represented by box 71. FIG. 2 shows a single input 1 and a single output 1. This filter is useful for applications such as dispersion compensation or as a narrow pass or bandpass filter. FIG. 3 shows a single input 1 and two outputs 1 and 2. This filter is useful for wavelength division multiplexing for dropping a signal or as a signal splitter. FIG. 4 shows two inputs 1 and 2 and a single output 1. This filter is useful for wavelength division multiplexing for adding a signal of for combining two signals. FIG. 5 shows a filter with two inputs 1 and 2 and two outputs 1 and 2. This filter is useful for wavelength division multiplexing for both adding and dropping signals.

Although the previous paragraph describes the applications in terms of single wavelengths, it will be appreciated that more than one wavelength of frequency could be added or dropped. The wavelengths that are added or dropped may be separated from each other by intermediate wavelengths. Additionally, the applications selected will likely depend upon selection of appropriate voltages on identical waveguide configurations.

Figure 6:
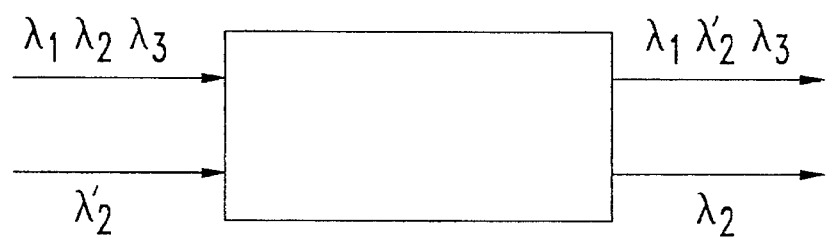
FIG. 6 is useful in summarizing the applications shown in FIGS. 2–5.

The above applications shown in FIGS. 2–5 are summarized in FIG. 6 which shows all four ports being used. Three wavelengths, $\lambda_1$, $\lambda_2$, and $\lambda_3$, are inputs to port 1 while wavelength $\lambda'_2$ is input to port 2. Three wavelengths, $\lambda_1$, $\lambda'_2$, and $\lambda_3$, are outputs from port 3 while wavelength $\lambda_2$ is output from port 4. Wavelength $\lambda'_2$ is thus added and wavelength $\lambda_2$ is dropped. Of course, more or fewer wavelengths may actually be present and/or added or dropped. Additionally, not all parts need be used. For example only ports 1 and 4 may be used and only wavelength $\lambda_2$ may be present.

Figure 7:
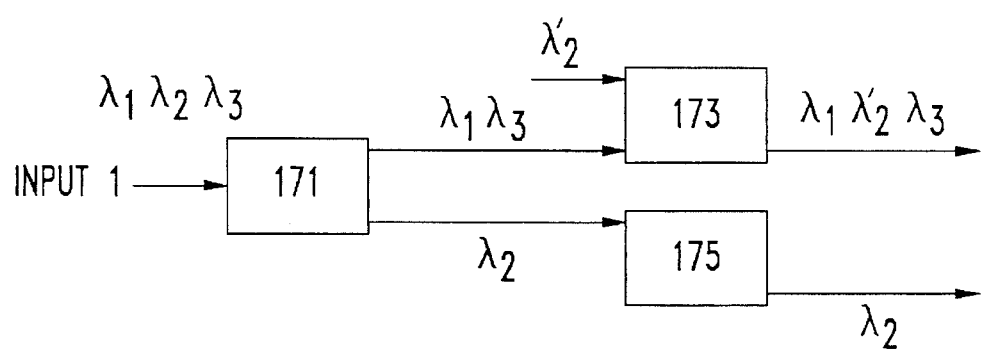
FIG. 7 is a schematic representation of yet another embodiment of this invention.

Another embodiment of this invention which is useful in wavelength division multiplexing systems is depicted in FIG. 7. There are three filters present which are shown as filters 171,173, and 175. The details of these filters are not shown as they have already been described with respect to, for example, FIG. 1. More particularly, filters 171,173 and 175 correspond to the applications shown in FIGS. 3, 4, and 2, respectively. Filters 173 and 175 are connected to the output ports of filter 17 1. Three wavelengths, $\lambda_1$, $\lambda_2$, and $\lambda_3$, are input to filter 171 which acts as a splitter and sends wavelengths $\lambda_1$ and $\lambda_2$ to filter 173 and wavelength $\lambda_2$ to filter 175. The latter filter is shown functioning as a drop filter and provides additional filtering for wavelength $\lambda_2$ thus improving the signal to noise ratio. Filter 173 is used to add wavelength $\lambda'_2$. As alluded to previously, this method can be used to add or drop sets of wavelengths.

Variations in the embodiments described will be readily thought of by those skilled in the art. For example, the waveguides could include the edge of the substrate with the radiation being reflected from the substrate edges. Additionally, the electrode pairs do not have to be associated with each of the waveguide stages; there need not be electrode pairs contacting the waveguide pairs that are adapted for use as inputs and outputs. Not all waveguide stages, for example, the first and last stages, need have electrodes 31.

I claim:

1. An optical filter comprising:

a substrate comprising an electro-optic material;

a plurality of waveguide stages in said substrate;

first and last waveguide ends adapted to use as first and second inputs and outputs, respectively;

a plurality of optical coupling regions, said coupling regions optically coupling adjacent waveguide stages to each other; and a plurality of electrode pairs controlling said optical coupling regions and a plurality of said plurality of electrodes individually contacting waveguide stages.

2. An optical filter as recited in claim 1 in which the waveguides of said plurality of waveguide stages have different optical path lengths within the stages.

3. An optical filter as recited in claim 1 further comprising a second optical filter attached to one of said outputs.

4. An optical filter as recited in claim 1 in which said electro-optic material comprises lithium niobate.

\* \* \* \* \*